United States Patent

Wolf et al.

[11] 3,943,758
[45] Mar. 16, 1976

[54] DEVICE FOR DETERMINING SURFACE STRAINS DURING THE MEASUREMENT OF INHERENT STRESSES IN STRUCTURAL COMPONENTS OF MACHINES OR APPARATUS

[75] Inventors: Helmut Wolf, Duisburg-Grossenbaum; Wolfgang Böhm, Mulheim (Ruhr); Erwin Stücker, Essen-Frintrop, all of Germany

[73] Assignee: Kraftwerk Union Aktiengesellschaft, Mulheim (Ruhr), Germany

[22] Filed: Sept. 9, 1974

[21] Appl. No.: 504,092

[30] Foreign Application Priority Data

Sept. 7, 1973  Germany............................ 2345309

[52] U.S. Cl. ................................. 73/88.5 R; 338/2
[51] Int. Cl.² ............................................ G01B 7/18
[58] Field of Search ....................... 73/88.5 R; 338/2

[56] References Cited
UNITED STATES PATENTS 3,765,230  10/1973  Bohm et al.......................... 73/88 R

FOREIGN PATENTS OR APPLICATIONS 942,033  11/1963  United Kingdom..................... 338/2

Primary Examiner—Charles A. Ruehl
Attorney, Agent, or Firm—Herbert L. Lerner

[57] ABSTRACT

Apparatus for checking a structural component for inherent stresses includes strain gage means for attachment to a surface measuring area of the component, the strain gage means having terminals for leads, means for cutting an annular groove into the component around the area, electrical response measuring means remote from the area, and leads extending from the terminals of the strain gage means to the electrical response measuring means for measuring the change in electrical response of the strain gage means due to the cutting of successive layers of material out of the groove, as indicative of the inherent stress existing prior thereto, the cutting means includes a crown boring tool for machining the annular groove around the measuring area, the crown boring tool having a shaft hollow throughout and being mounted in a hollow boring spindle, the terminal leads of the strain gage means attached to the measuring area extending through the crown boring tool and the hollow boring spindle. The apparatus further includes a base plate, the strain gage means being a plurality of strain gage strips mounted on the plate, each of the strips having two of the terminal leads, one of the terminal leads of each of the plurality of strain gage strips being connected to a common connecting spot on the base plate, and each of the other terminal leads of the plurality of strain gage strips being respectively connected to separate connecting spots on the base plate; cover plate means superposed on the base plate above the strain gage strips and the terminal leads and formed with openings overlying the connecting spots, the solder deposits respectively extending through the openings and connected with and fixing the position of the terminal leads, the solder deposits simultaneously serving as solder support spots connectible to exterior connecting lines leading to a measuring instrument.

5 Claims, 4 Drawing Figures

DEVICE FOR DETERMINING SURFACE STRAINS DURING THE MEASUREMENT OF INHERENT STRESSES IN STRUCTURAL COMPONENTS OF MACHINES OR APPARATUS

The invention relates to a device for determining surface strains during the measurement of inherent stresses in structural components of machines or apparatus.

In U.S. Pat. No. 3,765,230, issued Oct. 16, 1973, of which two of us are joint inventors, there is disclosed a method of measuring inherent stresses in structural components of machines and apparatuses such as rotors, discs, beams, containers and housings, the method comprising the steps of attaching strain gage means to a surface area of a structural component having a Young's modulus E; cutting an annular groove around the surface area in a sequence of steps, each time removing a layer of material, the material of the resulting core surrounded by the annular groove expanding analogously to inherent stresses prevailing in the surface area of the core prior to cutting the groove; measuring after each incremental cut the depths $d_z$ of the layer of removed material and determining the corresponding groove depth $z = \Sigma dz$; and also measuring each time by means of the strain gage means the resulting surface strains $$d\epsilon_z; \epsilon_z = \sum_{z=0}^{z} d\epsilon_z$$

of the core, thereby determining a first differential function $$\frac{d\epsilon_z}{d_z};$$

separately running a calibrating test with a specimen of calibrating material having a second Young's modulus E*, using a measuring spot geometry including groove configuration, strain gage means and arrangement thereof corresponding to the spot geometry of the structural component, the calibrating test comprising applying a known stress $\delta^*z$ to the specimen by exerting given external forces P* thereon, thereby simulating an inherent stress corresponding to that at any layer dz of the depth coordinate z of the specimen, cutting a groove by layer-wise removal of material and each time measuring the surface strains ($d\epsilon_z^*, \epsilon_z^* \Sigma\, dz$) of the remaining surface area of the core and the respectively corresponding cutting depths ($dz, z = \Sigma dz$), thereby determining a second differential function $$\frac{d\epsilon_z^*}{d_z}.$$

and determining from the known stress $\delta^*z$ and the second differential function $$\frac{d\epsilon_z^*}{d_z}.$$

the decay function $$K_z = f\left(E^*, \frac{1}{\delta_z^*}, \frac{d\epsilon_z^*}{d_z}\right)$$

and determining from the thus obtained quantities $K_z$ and $$\frac{d\epsilon_z}{d_z}.$$

the inherent stress $\delta_z(z)$ of the body released at any locality along the depth coordinate z of the body, which prevails at the surface area of the core, in accordance with the equation $$\delta_z(z) = f\left(E, \frac{1}{K_z}, \frac{d\epsilon_z}{d_z}\right)$$

In the device for performing the aforedescribed method, strain gage strips are employed which have a rectangular cross-section and have longitudinal and symmetry axes that extend through the center of the circular core. In this regard, a strain gage strip rosette formed of three gate strips which intersect in the center of the circular core is used, the gage strips being disposed in the three gaging or measuring directions and, accordingly, the rosette being in mirror-image symmetry with respect to two symmetry axes extending through the center of the circular core.

This strain gage strip rosette, according to the aforementioned U.S. Pat. No. 3,765,230, has a very complex structure which is difficult to manufacture. Namely, above the gage strip carrier which is adhesively secured to the measuring spot, a protective layer of a thermally and electrically insulating as well as plastic adhesive, which offers virtually no hindrance to the strain or elongation of the measuring strips, must be applied to the carrier, and the terminal wires of the respective gage strips must be led through this protective layer. Above the protective layer, a circular disc-shaped solder support spot carrier of the outer measuring leads of the strain gage device, the solder support spot carrier being accommodated to the measuring spot area, is threaded by means of bores upon the terminal or connecting wires of the respective strain gage strips and slightly pressed into the protective layer, whereupon solder support spots thereof are soldered to the terminal or connecting wires. This solder support spot carrier is formed of four quarter-sector-shaped metal platelets which define an insulating slot in the form of coordinate axes. This assembly must be newly forthcoming at each measuring spot, entailing a considerable work effort and, in addition, can readily lead to switching errors and measuring inaccuracies. The threading of the gage strip terminal wire through the solder bearing point, with the aid of pincers additionally impedes the installation of the measuring or gaging element.

In U.S. Pat. No. 3,803,905, issued Apr. 16, 1974, of which we are all joint inventors, there is disclosed apparatus for checking a structural component for inherent stresses which includes strain gage means for attachment to a surface measuring area of the component, the strain gage means having terminals for leads, means for cutting an annular groove into the component around the area, electrical response measuring means remote from the area, and leads extending from the terminals of the strain gage means to the electrical response measuring means for measuring the change in electrical response of the strain gage means due to the cutting of successive layers of material out of the groove, as indicative of the inherent stress existing prior thereto, the cutting means including a crown boring tool for machining the annular groove around the measuring area, the crown boring tool having a shaft hollow throughout and being mounted in a hollow boring spindle, the terminal leads of the strain gage means attached to the measuring area extending through the crown boring tool and the hollow boring spindle.

It is accordingly an object of the invention to provide a device for determining surface strains by the use of such gage strips, which device is considerably simpler in construction than the heretofore known devices of this general type and may simply be secured adhesively as an integrated building block or element to the measuring spot.

With the foregoing and other objects in view, there is provided, in accordance with the invention, in an apparatus for checking a structural component for inherent stresses including strain gage means for attachment to a surface measuring area of the component, the strain gage means having terminals for leads, means for cutting an annular groove into the component around the area, electrical response measuring means remote from the area, and lead extending from the terminals of the strain gage means to the electrical response measuring means for measuring the change in electrical response of the strain gage means due to the cutting of successive layers of material out of the groove, as indicative of the inherent stress existing prior thereto, the cutting means including a crown boring tool for machining the annular groove around the measuring area, the crown boring tool having a shaft hollow throughout and being mounted in a hollow boring spindle, the terminal leads of the strain gage means attached to the measuring area extending through the crown boring tool and the hollow boring spindle, the improvement therein which comprises a base plate, the strain gage means including a plurality of strain gage strips mounted on the plate, each of the strips having two of the terminal leads, one of the terminal leads of each of the plurality of strain gage strips being connected to a common connecting spot on the base plate, and each of the other terminal leads of the plurality of strain gage strips being respectively connected to separate connecting spots on the base plate; cover plate means superposed on the base plate above the strain gage strips and the terminal leads and formed with openings overlying the connecting spots, and solder deposits respectively extending through the openings and connected with and fixing the position of the terminal leads, the solder deposits simultaneously serving as solder support spots connectible to exterior connecting lines leading to a measuring instrument.

By means of the foregoing construction, it is possible to adhesively secure the strain gage strips, as an integrated building block, to the measuring spot even prior to the application of the tool for cutting the annular groove around the measuring spot, and to solder the connecting leads directly to this building block.

Other features which are considered as characteristic for the invention are set forth in the appended claims.

Although the invention is illustrated and described herein as device for determining surface strains during the measurement of inherent stresses in structural components of machines or apparatus, it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
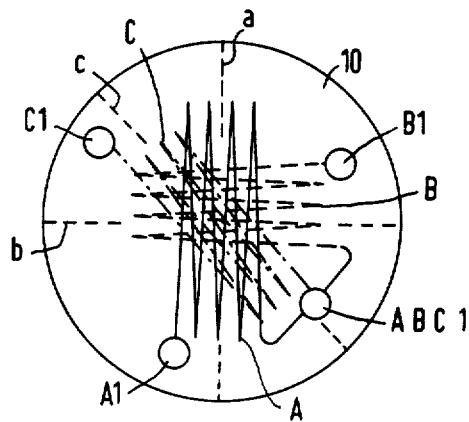
FIG. 1 is a diagrammatic top plan view of the base plate of the device of the invention showing the strain gage strips mounted thereon, as well as the connecting spots thereof.
Figure 2:
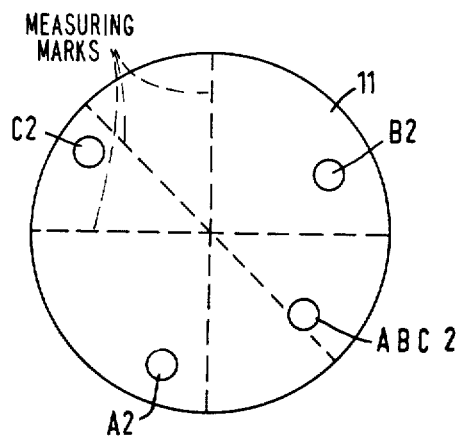
FIG. 2 is a top plan view of the enclosed building block showing the solder support spots.

Referring now to the drawing and first, particularly, to FIG. 1 thereof, there is shown a base plate 10 provided with the three strain gage strips A, B and C, disposed in respective gaging or measuring directions a, b, and c. The direction of the two gage strips A and B intersect at an angle of 90°, while the gage strip C is disposed in a direction diagonal to the two gage strips A and B. It should also be noted that the device shown in FIG. 1 is considerably larger than its actual size. The actual diameter of the base plate 10 is about 12 mm. Of the three strain gage strips A, B and C, each of which has two terminal leads, one of the terminal leads of each of the three gage strips is led to a common connecting spot and is fixed there to the base plate 10. The other terminal leads of the strain gage strips A, B and C are each led to separate connecting spots A1, B1 and C1 on the base plate 10 and are also fixed there. After all strain gage strips and the terminal leads thereof have been mounted in the aforedescribed manner on the base plate 10, a cover plate 11 is superposed on this layer of strain gage strips. The cover plate 11 is formed, at locations overlying the connecting spots A1, B1 and C1 and ABC1 of the base plate 10, with appropriate openings or bores, so that the ends of the corresponding terminal leads can be seen from above. Through these openings, the terminal leads of the strain gage strips are then soldered, a given amount of excess solder being used for each solder location, so that, accordingly, on the one hand, the cover plate 11 is firmly secured or fixed to the base plate 10, and moreover, the solder deposit which juts out of each solder location serves as a solder support spot A2, B2 and C2 and ABC2 for external connecting lines leading to a measuring instrument.

Figure 3:
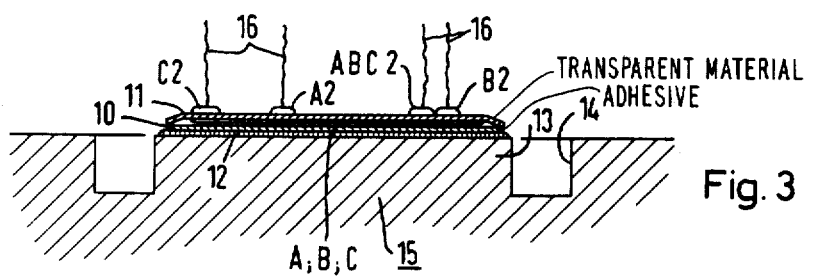
FIG. 3 is a diametrical cross-sectional view of FIG. 2 showing the building block after it has been adhesively secured on an appropriate measuring spot of a component, the inherent stress of which is to be measured.

In FIG. 3, the assembled device is shown in installed position. On a workpiece or machine component 15, the inherent stress of which is to be measured, an annular groove 14 is cut in segments around a circular measuring spot 13. The building block component of the device of the invention is secured in the measuring spot 13 by the base plate 10 through an adhesive 12 which does not alter the measurement. Between the base plate 10 and the cover plate 11 there are located, as aforedescribed, the strain gage strips A, B and C, disposed in appropriate directions. At the upper surface of the cover plate 11, there are seen in FIG. 3 the solder support spots A2, B2, C2 and ABC2, to which connecting leads 16 leading to a suitable measuring instrument are soldered.

It is advantageous for the cover plate 11 to be formed of a transparent material so that either the position of the strain gage strips or a separately drawn-in system of coordinates, substantially corresponding to the measuring directions $a$, $b$ and $c$, is observable from above. It is also possible, however, to dispose in a non-transparent cover plate, appropriate measuring marks which point in the direction of the strain gage strips, or so to dispose the solder support spots beforehand and to coordinate the strain gage strips therewith in a manner that the direction in which the individual gage strips extend will be apparent.

Figure 4:
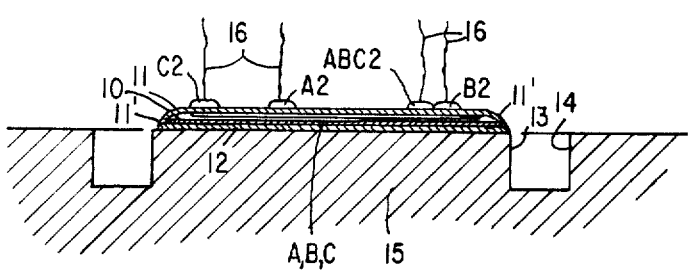
FIG. 4 is a view similar to that of FIG. 3 of another embodiment of the invention.

As shown in FIG. 4, it is also possible for the cover plate 11 to have a larger diameter than the base plate 10 and to be secured by adhesive at the consequently projecting area 11' directly to the measuring spot. As a result, the cover plate serves, simultaneously, as a cover and as a protection for the installed measuring spot.

With a strain gage strip assembly of such construction, considerable simplification over the heretofore employed devices of this general type is possible. For one thing, a shorter installation period is required, since the gage or measuring device is directly secured by adhesive to the measuring spot and, directly following the adhesively securing step, the measuring lines or leads can be connected. Through the integrated and previously prepared type of construction, switching errors within the device and between the individual gage strips are precluded. More, this gage strip assembly can be secured adhesively to the structural component that is to be tested, prior to setting up the foot portion of the annular groove milling tool.

This relatively simple construction and integrated building block or element may be employed whereever multi-axial stresses are generally to be measured.

For further details with respect to the theoretical considerations forming the basis for the invention of this application, reference can be made to the aforementioned U.S. Pat. Nos. 3,803,905 and 3,765,230, which are incorporated by reference therein.

We claim:

1. In apparatus for checking a structural component for inherent stresses including strain gage means for attachment to a surface measuring area of the component, the strain gage means having terminals for leads, means for cutting an annular groove into the component around the area, electrical response measuring means remote from the area, and leads extending from the terminals of the strain gage means to the electrical response measuring means for measuring the change in electrical response of the strain gage means due to the cutting of successive layers of material out of the groove, as indicative of the inherent stress existing prior thereto, the cutting means including a crown boring tool for machining the annular groove around the measuring area, the crown boring tool having a shaft hollow throughout and being mounted in a hollow boring spindle, the terminal leads of the strain gage means attached to the measuring area extending through the crown boring tool and the hollow boring spindle, the improvement therein which comprises a base plate, the strain gage means including a plurality of strain gage strips mounted on said plate, each of said strips having two of the terminal leads, one of the terminal leads of each of said plurality of strain gage strips being connected to a common connecting spot on said base plate, and each of the other terminal leads of said plurality of strain gage strips being respectively connected to separate connecting spots on said base plate; cover plate means superposed on said base plate above said strain gage strips and said terminal leads and formed with openings overlying said connecting spots, and solder deposits respectively extending through said openings and connected with and fixing the position of said terminal leads, said solder deposits simultaneously serving as solder support spots connectible to exterior connecting lines leading to a measuring instrument.

2. Apparatus according to claim 1 wherein said cover plate is formed of transparent material, and said base plate is provided with a coordinate system characterizing the directions in which said strain gage strips are disposed.

3. Apparatus according to claim 1 including measuring mark means carried by said cover plate for identifying the positions of said strain gage strips.

4. Apparatus according to claim 1 wherein said connecting spots and said solder support spots are so associated with said strain gage strips as to indicate the direction in which the respective strain gage strips are disposed.

5. Apparatus according to claim 1 wherein said cover plate has a larger diameter than that of said base plate so that a marginal edge of said cover plate projects beyond said base plate, said cover plate being adhesively securable at said marginal edge thereof directly to the measuring area.

* * * * *